(12) United States Patent
Matsuo et al.

(10) Patent No.: US 6,906,491 B2
(45) Date of Patent: Jun. 14, 2005

(54) MOTOR CONTROL EQUIPMENT

(75) Inventors: Takayoshi Matsuo, Brown Deer, WI (US); Satoshi Tanabe, Yokosuka (JP); Masazumi Yoshino, Yokohama (JP)

(73) Assignees: Rockwell Automation Technologies, Inc., Mayfield Heights, OH (US); Reliance Electric Limited, Yokohama (JP)

( * ) Notice: Subject to any disclaimer, the term of this patent is extended or adjusted under 35 U.S.C. 154(b) by 0 days.

(21) Appl. No.: 10/600,489

(22) Filed: Jun. 20, 2003

(65) Prior Publication Data

US 2004/0257027 A1 Dec. 23, 2004

(51) Int. Cl.[7] .............................. H02P 1/46; H02P 7/36; H02P 1/18; G05B 1/06
(52) U.S. Cl. ........................ 318/722; 318/721; 318/801; 318/806; 318/638; 318/352; 318/138; 318/439; 318/254
(58) Field of Search ................................. 318/722, 721, 318/715, 806, 798–801, 51, 55, 638, 639, 652, 717, 719, 138, 439, 254

(56) References Cited

U.S. PATENT DOCUMENTS 6,696,812 B2 * 2/2004 Kaneko et al. ............. 318/700
2002/0117990 A1 * 8/2002 Sawada et al. ............. 318/727

FOREIGN PATENT DOCUMENTS

JP 2001112282 A * 4/2001 ............. H02P/6/12
JP 2001190099 A * 7/2001 ........... H02P/21/00

* cited by examiner

*Primary Examiner*—Edgardo San Martin
(74) *Attorney, Agent, or Firm*—Quarles & Brady LLP; William R. Walbrun

(57) ABSTRACT

A motor controller is provided including a synchronous motor, a feed back detector for detecting the position and velocity of the rotor of the synchronous motor, a detector for detecting a magnetic pole position of the rotor of the synchronous motor, an inverter for controlling an electric power to be supplied to the synchronous motor, an estimator for estimating the magnetic pole position of the rotor of the synchronous motor, and a detector for detecting the abnormality of the feed back detector.

13 Claims, 10 Drawing Sheets

MOTOR CONTROL EQUIPMENT

BACKGROUND OF THE INVENTION

1. Technical Field of the Invention

The present invention relates to a motor controller and, more particularly, to a motor controller capable of performing a safe and highly reliable motor control in the case where a trouble arises particularly in a sensor for detecting a position or a velocity of the rotor of a synchronous motor.

2. Prior Art

In general, a controller for controlling a synchronous motor has been used conventionally to find the position and velocity of the rotor of a motor from information of a sensor mounted on the motor, that is, a feed back detector. In the case where signal from the feed back detector becomes abnormal due to a defect of the feed back detector, the motor becomes non-controllable since it is not possible to find the position and velocity of the rotor of the motor. Hence, the motor is stopped by being allowed to make a free running or by means of a brake mechanically mounted on a motor shaft.

Further, in addition to a velocity feed back detector, a velocity feed back detector for use of a velocity feed back loss detection is mounted on the motor, and the velocity is calculated by a motor controller from information from the respective velocity feed back detectors, and these velocities are compared, and if there arises any difference in the velocities, it is determined that either of the velocity feed back detectors is defective, and the velocity feed back loss is detected. After the velocity feed back loss is detected, a velocity control is performed, and the motor is stopped, by using velocity feed back signal from the velocity feed back detector in normal operation.

As described above, when there arises the defect in the feed back detector of the motor, with respect to a method of stopping the motor by allowing it to make the free running or by means of the mechanical brake, there is available the motor controller in which a plurality of feed back detectors are employed and these detectors are selected for use when the feed back detector is abnormal. However, such a method increases the number of feed back detectors and, accompanied with this increase, detection circuits and electronic switches are increased. As a result, comparing to the case of a single feed back detector, the number of parts is increased, thereby causing a problem in that the reliability of the parts is lowered. This finally leads to the lowering of the reliability of the whole controller and, further, causes a problem in that an installation area is increased and costs are driven up.

Further, in Japanese Patent Publication No. 2001-112282, there is disclosed the motor controller, comprising a synchronous motor, magnetic pole position detection means for detecting the magnetic pole position of the rotor of the synchronous motor, inverter control means for controlling an electric power to be supplied to the synchronous motor according to the magnetic pole position detected by the magnetic pole position detection means, sensor abnormality detection means for detecting the abnormality of the magnetic pole position detection means, and magnetic pole position estimation means for estimating the magnetic pole position, wherein, in the case where the abnormality of the magnetic pole position detection means is detected by the sensor abnormality detection means, the electric power to be supplied to the synchronous motor according to the magnetic pole position estimated by the magnetic pole position estimation means is controlled.

The sensor abnormality detection means for detecting the abnormality of the magnetic pole position detection means is constituted by a waveform processing portion, an UP DOWN counter, an address generation means, a commutation sensor (CS) edge detector, a CS abnormality detector, a magnetic pole position detector, a Z-phase abnormality detector, a Z-phase switch, and an A and B-phase abnormality detector.

A and B-phase signals which are sensor outputs of the magnetic pole position detection sensor, a Z-phase signal, and each signal of CS1 to CS3 signals, and each inversion signal of all these signals are inputted to the waveform processing portion, and are subjected to the waveform processing such as a waveform shaping.

The A and B-phase signals subjected to the waveform processing are counted by the UP DOWN counter, and are outputted to address generation means. Further, the CS1 to CS3 signals are outputted to a CS edge detector, a CS abnormality detector, and a magnetic pole position detector.

Moreover, the CS1 signal is transmitted to the counter. The Z-phase signal is outputted to a Z-phase abnormality detector, a Z-phase switch, and the counter.

The Z-phase signal detects whether or not a Z-phase pulse is generated based on a CS1 pulse by the Z-phase abnormality detector, and outputs a Z-phase abnormality signal. The A and B-phase signals generate a predetermined pulse signal for every one rotation of the motor. The number of pieces of the A and B-phase edges between CS edges is counted and, when the number of pieces deviates from a predetermined range, an A and B-phase abnormality signal is outputted. Further, the CS abnormality detector observes a state of the CS1 to CS3 signals, and outputs a CS abnormality signal when all the signals are "H" or "L".

By so doing as described above, when the abnormality of the Z-phase signal, the A and B-phase signals, and the CS signals are detected, the motor is controlled according to the type of signals in which the abnormality occurs.

In such a motor controller, in addition to the feed back detector for detecting the position and velocity of the rotor of the synchronous motor, a CS signal detector for detecting a commutation signal is provided to detect a magnetic pole position of the rotor of the synchronous motor and, therefore, in the case where the detection functions of these detectors all become abnormal, there arises a problem in that all the references of a comparison to see whether it is good or bad cease to exist, so that the detection or judgment of the abnormality becomes absolutely impossible with a result that it is no longer possible to control the motor.

Hence, the object of the present invention is to provide a motor controller in which an electrical angle calculated from the signal outputted from the feed back detector and the electrical angle found from an induced voltage of stator windings are compared and, when it is determined that they are abnormal, a motor is controlled by an electrical angle estimated from the induced voltage of the motor.

SUMMARY OF THE INVENTION

The motor controller of the present invention comprises a synchronous motor, a feed back detector mounted on the synchronous motor for detecting the position and velocity of a rotor of the synchronous motor, magnetic pole position detection means for detecting the magnetic pole position of the rotor of the synchronous motor from output signals of the feed back detector, inverter means for controlling an electric power to be supplied to the synchronous motor according to the magnetic pole position detected by the magnetic pole position detection means, magnetic pole position estimation means for estimating a magnetic pole position of the rotor of the synchronous motor from the induced voltage of the stator windings of the synchronous motor, and magnetic position abnormality detection means for detecting the abnormality of the feed back detector by always comparing the magnetic pole position detected by the magnetic pole position detection means and an estimated magnetic pole position estimated by the magnetic pole position estimation means. When the magnetic pole position abnormality detection means detects the abnormality of the feed back detector, the inverter means controls the electric power to be supplied to the synchronous motor according to the estimated magnetic pole position obtained by the magnetic pole position estimation means.

In this way, it is possible to perform a safe and highly reliable motor driving control even in the case where there occurs the abnormality in the feed back detectors for detecting the magnetic pole position or velocity of the rotor of the synchronous motor and the feed back signals are not outputted at all from these detectors.

A PREFERRED EMBODIMENT OF THE INVENTION

An embodiment of the present invention will be described below with reference to the drawings.

Figure 1:
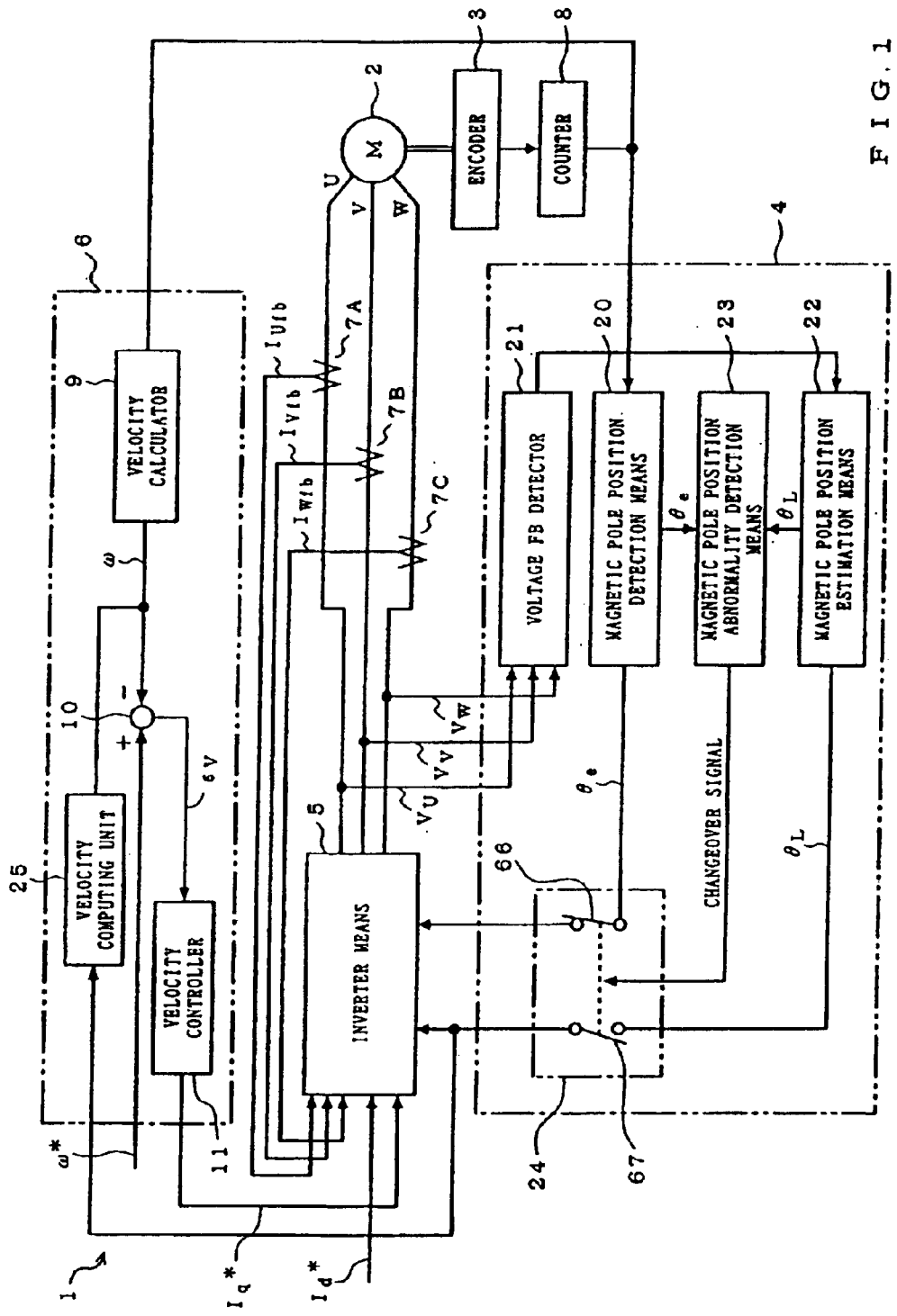
FIG. 1 is a block diagram showing one embodiment of a motor controller according to the present invention.

FIG. 1 is a block diagram showing one embodiment of a motor controller 1 according to the present invention. The motor controller 1 is constituted by sensor control means 4, inverter means (or vector control means) 5, velocity control means 6, current detectors 7A, 7B and 7C, an encoder 3, and an encoder counter 8. The encoder 3 is an absolute value rotary encoder, and is a feed back detector (sensor) for use of a position and velocity detection mounted on a rotational axis of a brushless synchronous motor 2 (hereinafter, referred to as the motor), which is a control object of the motor controller 1.

The sensor control means 4 is constituted by magnetic pole position detection means 20, voltage feedback (FB) detector 21, magnetic pole position estimation means 22, magnetic pole position abnormality detection means 23 and a sensor signal switch 24.

The velocity control means 6 is constituted by a velocity computing unit 25, a velocity calculator 9, a subtractor 10 and a velocity controller 11.

The current detectors 7A, 7B and 7C detect the current of respective phases U, V and W of the motor 2, and feed back the current to the inverter means 5.

The inverter means 5 controls an electric power to be supplied to the motor.

In the motor controller 1 constituted as above, the operation of the encoder 3 in normal condition will be described.

The counter 8 counts a pulse outputted by the encoder 3, and inputs an output value to the magnetic pole position detection means 20 of the sensor control means 4 and the velocity calculator 9 of the velocity control means 6. The velocity calculator 9 calculates a real angular velocity $\omega$ of the motor 2 from the output value of the counter. This real angular velocity $\omega$ and an angular velocity command signal $\omega$ are inputted to the subtractor 10, and an angular velocity differential signal $\epsilon_v$ is calculated. The obtained angular velocity differential signal $\epsilon_v$ is inputted to the velocity controller 11, and a quadrature axis current command signal $I_q^*$ is calculated. This quadrature axis current command signal $I_q^*$, a direct axis current command signal $I_d^*$, respective current feed back signals $I_{ufb}$, $I_{vfb}$ and $I_{wfb}$ of the current detectors 7A, 7B and 7C, and an electrical angular signal $\theta_e$ calculated from the output value of the counter 8 by the magnetic pole position detection means 20 are inputted to the inverter means 5, and the motor 2 is vector-controlled for a continuous driving. The direct axis aligns to the rotor magnetic pole direction.

Figure 2:
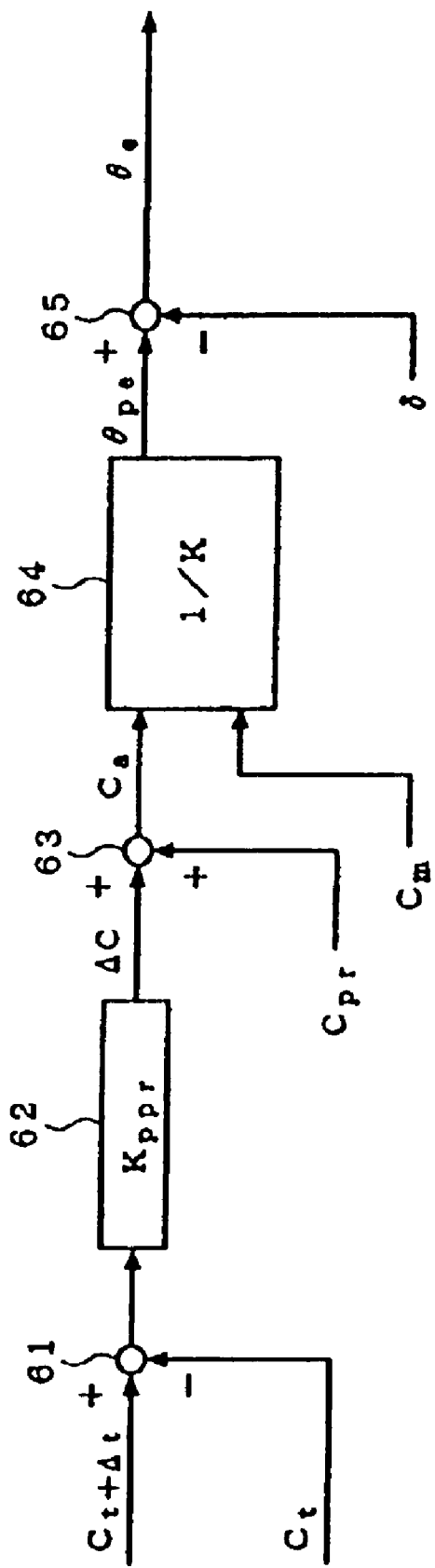
FIG. 2 is a view showing a constitution of magnetic pole position detection means to find an electrical angle $\theta_e$ from an encoder output signal.

FIG. 2 is a view showing a constitution of the magnetic pole position detection means 20 for finding the electrical angle $\theta_e$ from the counter output value. The magnetic pole position detection means 20 is constituted by subtractors 61 and 65, a coefficient alignment means 62, an adder 63, and a counter output value—electrical angle converter 64.

The subtractor 61 inputs a counter output value $C_t$ of the counter 8 in a length of time t and a counter output value $C_{(t+\Delta t)}$ after the elapse of a micro-time $\Delta t$, and a difference $(C_{(t+\Delta t)} - C_t)$ of a mechanical angle of the encoder 3 in a micro-time $\Delta t$ is arithmetically processed, and this difference $(C_{(t+\Delta t)} - C_t)$ is outputted.

The coefficient alignment means 62 inputs the difference signal $(C_{(t+\Delta t)} - C_t)$, and multiplies this difference signal $(C_{(t+\Delta t)} - C_t)$ by a correction coefficient $K_{ppr}$, and outputs an electrical angle (counter output value) $\Delta C$, which corresponds to the obtained difference signal. This electrical angle (counter output value) $\Delta C$ is found as follows:

$$\Delta C = K_{ppr} \times (C_{(t+\Delta t)} - C_t) \qquad (1)$$

where $K_{ppr}=P/2$, provided that P is the number of magnetic poles of the rotor.

The adder 63 outputs a total electrical angle (counter value) $C_a$, which is obtained by adding a cumulative electrical angle (counter output value) $C_{pr}$ from a time zero to a time t and the electrical angle (counter output value) $\Delta C$, which is equivalent to the micro-time $\Delta t$. The total electrical angle $C_a$ is found as follows:

$$C_a = C_{pr} + K_{ppr} \times (C_{(t+\Delta t)} - C_t) \qquad (2)$$

The counter value—electrical angle converter 64 allocates allocation values O and $C_m$, respectively to the electrical angles 0° and 360° (or 2π radian) of the rotor. This is because, for example, by allowing $C_m$ to match a numeric value 16384 (allocated to an electrical angle $\theta_p$360° (or 2π radian) found from the induced voltage of the stator windings to be described later or 2π radian), the comparison of both $\theta_e$ and $\theta_p$ is made easy. Then, the electrical angle $\theta_{pe}$ in the time t is found as follows:

$$\theta_{pe}(\text{degree or radian}) = 360° \text{ (or } 2\pi) \times C_a/C_m \qquad (3)$$

where $1/K = C_a/C_m$. The allocation of $C_m$ makes it possible to maintain general-purpose properties of the electrical angle in terms of measurement, even if the type of the encoder 3 is, for example, the one in which the number of total pulses is different per one rotation.

The subtractor 65 outputs the electrical angle $\theta_e$ obtained by subtracting an offset amount δ from the electrical angle $\theta_{pe}$ of the rotor. That is, usually, the magnetic pole of the rotor and the counter output value 0 of the encoder 3 are shifted. By taking into consideration and following through zero-adjusting the amount in which the counter output value corresponding to this shift is converted to the electrical angle—the so-called offset amount δ, the electrical angle $\theta_e$ is obtained. As one method of finding the offset amount, when an appropriate level of a direct current voltage is applied to the stator winding of the U phase, a magnetic field is generated from that stator winding. By being attracted to the stator winding by this magnetic action, that is, by the N pole or the S pole of the magnet's poles of the rotor, the rotor of the motor 2 is kept in a locked state, and the value converted to the electrical angle by the expression (3) can be found from the counter reading value at this time. For example, in the case where the counter allocation value corresponding to the electrical angle 2π radian is 16384 and a shift amount is 1638, the offset amount becomes 0.628 radian.

Figure 3:
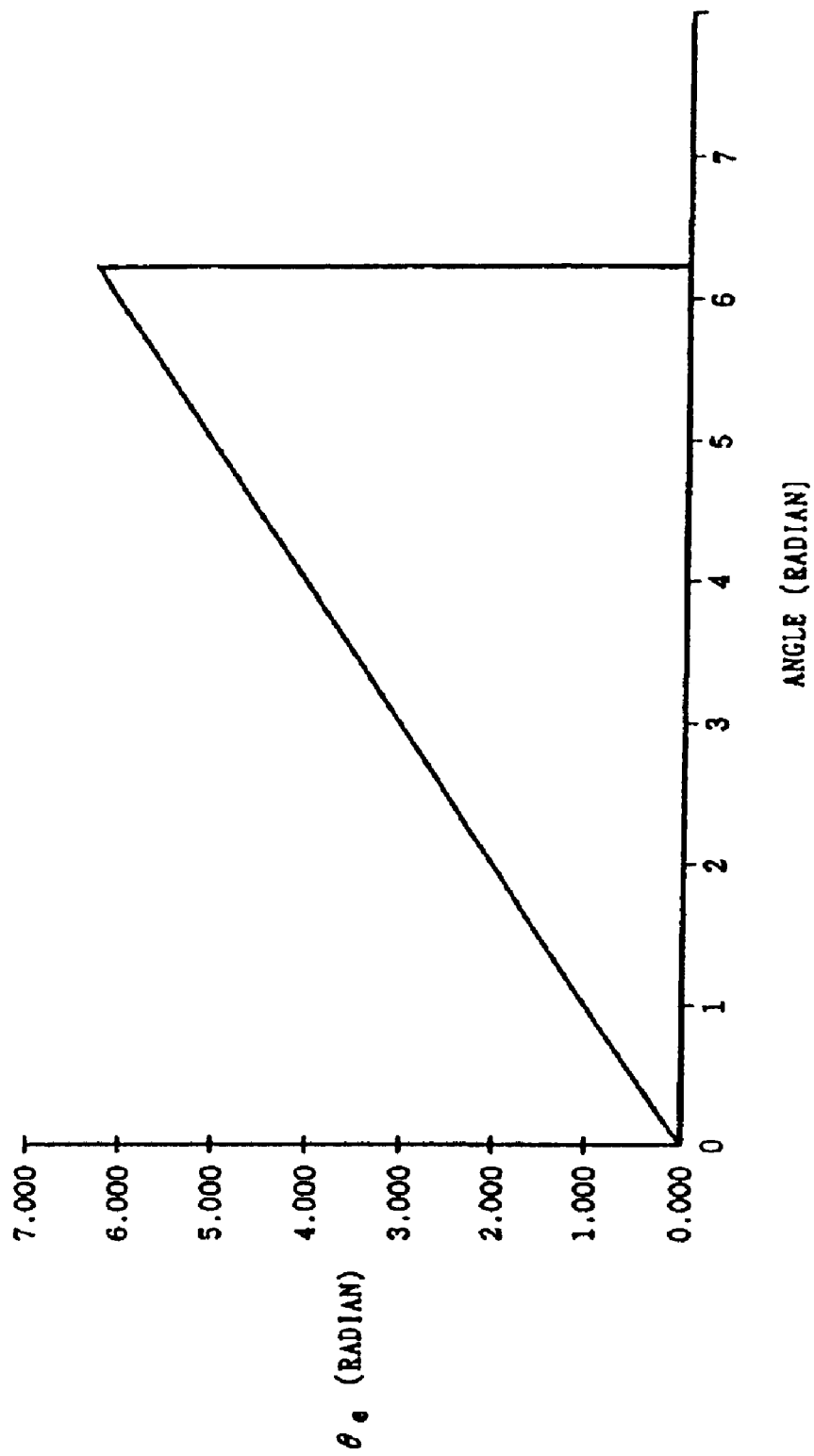
FIG. 3 is a view showing the electrical angle $\theta_e$ found from the encoder output signal.
Figure 4:
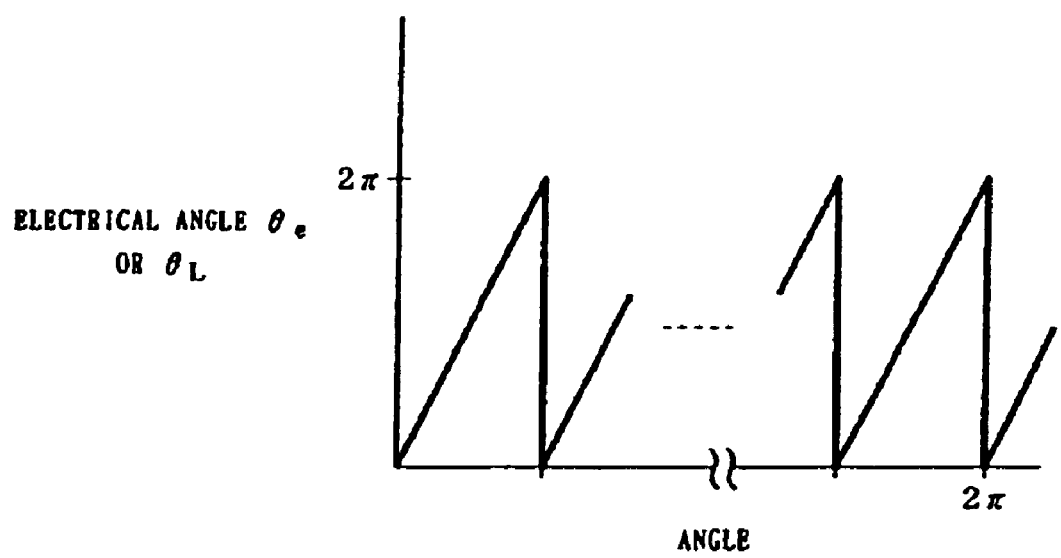
FIG. 4 is a view showing the electrical angle $\theta_e$ or $\theta_{LO}$ for a mechanical angle of the rotor or encoder in the case of any number of magnetic poles.

FIG. 3 is a view showing a relationship between the mechanical angle of the encoder 3 and the electrical angle $\theta_e$ of the rotor in the case where the number of magnetic poles is two poles. Here, the axis of ordinate shows the electrical angle $\theta_e$ of the rotor, and the axis of abscissa shows the mechanical angle of the encoder. Assuming that the number of other magnetic poles is taken as P pieces, since the relationship between the mechanical angle of the encoder 3 and the electrical angle $\theta_e$ of the rotor is such that the electrical angle $\theta_e$ becomes P/2 times the mechanical angle of the encoder, a straight line showing the electrical angle $\theta_e$ repeatedly changes by P/2 time in the shape of a saw tooth as shown in FIG. 4, while the mechanical angle of the encoder changes by 2π radian.

From the above-described result, when the number of magnetic poles, the counter allocation value and the offset amount are given, it is possible to calculate the electrical angle $\theta_e$ from any count value by the expression (3).

Next, the method of finding the estimated electrical angle of the rotor from the induced voltage of the stator windings of the stator in the magnetic pole position estimation means 22 will be described below.

The voltage FB detector 21 takes the induced voltages $V_U$, $V_V$ and $V_W$ taken out from respective stator windings of the motor 2 as input signals, and calculates on the basis of the expressions (4) and (5), and outputs a correlated voltage signal $V_{UV}$ of U-V phases and a correlated voltage $V_{VW}$ of V-W phases.

$$V_{UV} = V_U - V_V \qquad (4)$$

$$V_{VW} = V_V - V_W \qquad (5)$$

These correlated voltage signals are transmitted to the magnetic pole position estimation means 22.

First, the estimated electrical angle when the motor is not loaded will be described. Assuming that a non-loaded estimated electrical angle is taken as $\theta_{LO}$, the magnetic pole position estimation means 22 takes the correlated voltage signal $V_{UV}$ and the correlated voltage $V_{VW}$ as input signals, and calculates and outputs the estimated electrical angle $\theta_{LO}$ of the rotor.

Figure 5:
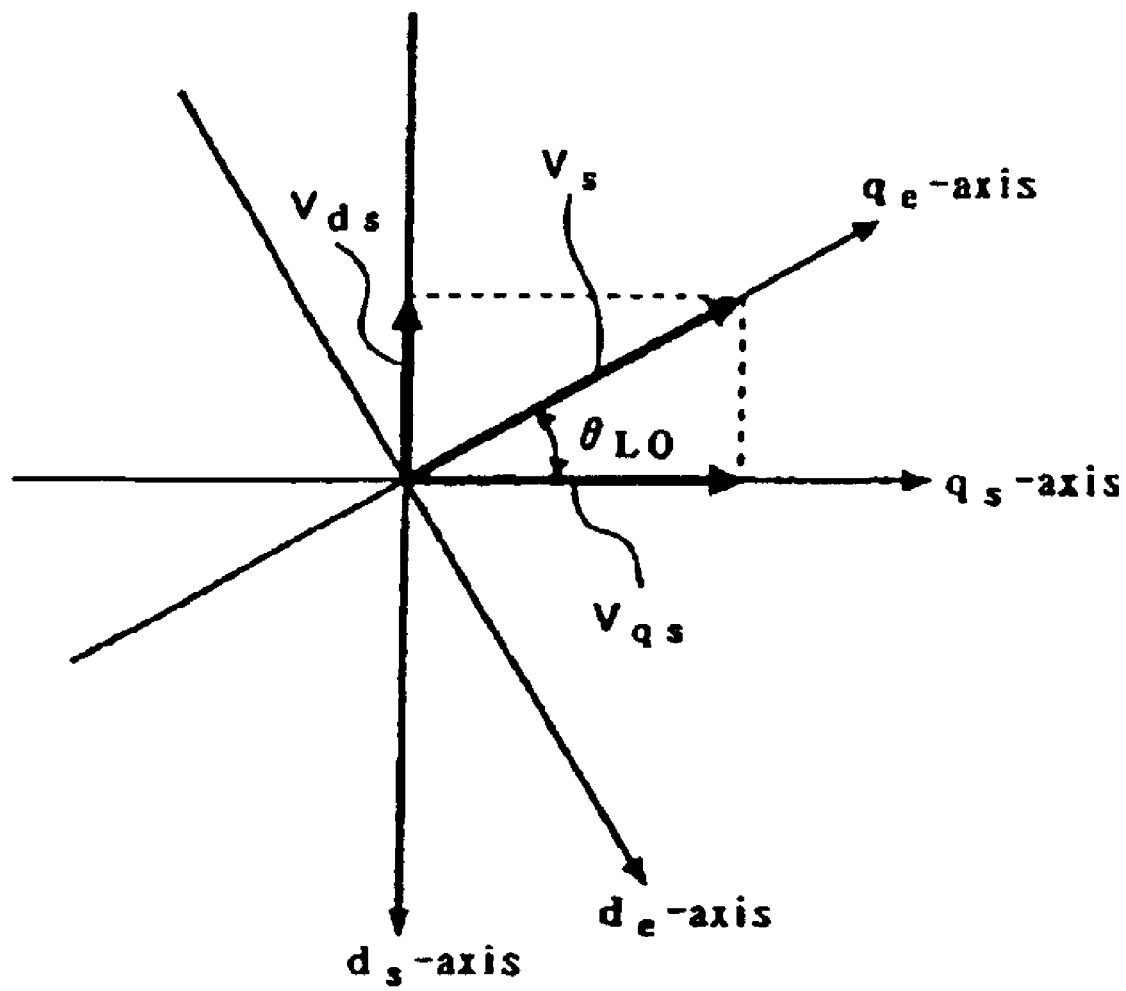
FIG. 5 is a view showing a relationship between a voltage vector $V_s$ and a $d_s$–$q_s$ coordinate system and $d_o$–$q_e$ coordinate system.

FIG. 5 is a view showing the relationship between a rotating magnetic field vector (hereinafter referred to as a voltage vector) $V_s$ of the induced voltages of three phases U, V and W and a $d_s$–$q_s$ coordinate system and a $d_e$–$q_e$ coordinate system. Here, the $d_s$–$q_s$ coordinate system is a coordinate system at rest of the stator, and the $d_e$–$q_e$ coordinate system is a rotational coordinate system of the rotor.

That is, FIG. 5 is a view showing the stator in the motor 2 being symmetric three phase concentrated windings and the relationship between the $d_s$–$q_s$ coordinate system at rest ($d_s$ is positive in a downward direction) and the $d_e$–$q_e$ rotational coordinate system of two phase concentrated windings, both of which are equivalent to the symmetric three phase concentrated windings, and the voltage vector $V_s$, which converts the induced voltages of the three phases U, V and W into two phase. Note that a vector $V_{qs}$ shows a $q_s$ component (quadrature axis component) of the voltage vector $V_s$ in the $d_s$–$q_s$ coordinate system at rest (axes $d_s$ and $q_e$ are coordinate systems which are orthogonal to each other), and a vector $V_{ds}$ shows a $d_s$ component (direct axis component) of the voltage vector $V_s$. Now, the motor 2 rotates with the $d_e$–$q_e$ rotational coordinate system (axes $d_e$ and $q_e$ are coordinate systems which are orthogonal to each other) of the rotor aligned with the voltage vector $V_s$. That is, an axis $q_e$ in the $d_e$–$q_e$ rotational coordinate system of the rotor of the motor 2 rotates aligned with the voltage vector $V_s$.

Hence, the angle made by the voltage vector $V_s$ based on the induced voltages of the three phases U, V and W and a forward direction of the axis $q_s$ provides the estimated electrical angle $\theta_{LO}$ of the rotor in the motor 2.

Next, calculation expressions of the estimated electrical angle $\theta_{LO}$ of the rotor will be described.

The components of the axis $q_s$ direction defined in FIG. 5 and the axis $d_s$ direction orthogonal to this are taken as $V_{qs}$ and $V_{ds}$, respectively and, from each value of $V_{qs}$ and $V_{ds}$, the estimated electrical angle $\theta_{LO}$ can be calculated. That is, by using the correlated voltages $V_{UV}$ and $V_{VW}$, $V_{qs}$ and $V_{ds}$ are found as follows:

$$V_{qs} = V_{UV} + V_{VW}/2 \qquad (6)$$

$$V_{ds} = -\sqrt{3} V_{VW}/2 \qquad (7)$$

When absolute values of $V_{qs}$ and $V_{ds}$ are represented as $V_{qsa}$ and $V_{dsa}$, respectively, the following expressions are found:

$$V_{qsa} = abs(V_{UV} + (V_{VW}/2)) \qquad (8)$$

$$V_{dsa} = abs(-\sqrt{3} V_{VW}/2) \qquad (9)$$

where "a b s" represents the absolute value.

The estimated electrical angle $\theta_{LO}$ is calculated by selecting the expressions shown below according to the size of respective values $V_{ds}$, $V_{qs}$, $V_{qsa}$ and $V_{dsa}$. That is, in the case where $V_{ds} \leq 0$, if $V_{qs}0 \geq 0$ and $V_{qsa} > V_{dsa}$, then, $$\theta_{LO} = \tan^{-1}(V_{dsa}/V_{qsa}) \qquad (10)$$

If $V_{qs} \geq 0$ and $V_{qsa} \leq V_{dsa}$, then, $$\theta_{LO}=\pi/2-\tan^{-1}(V_{qsa}/V_{dsa}) \quad (11)$$

If $V_{qs}<0$ and $V_{qsa}<V_{dsa}$, then, $$\theta_{LO}=\pi/2+\tan^{-1}(V_{qsa}/V_{dsa}) \quad (12)$$

If $V_{qs}<0$ and $V_{qsa} \geq V_{dsa}$, then, $$\theta_{LO}=\pi-\tan^{-1}(V_{dsa}/V_{qsa}) \quad (13)$$

In the case where $V_{ds}>0$, if $V_{qs}<0$ and $V_{qsa}>V_{dsa}$, then, $$\theta_{LO}=\pi+\tan^{-1}(V_{dsa}/V_{qsa}) \quad (14)$$

If $V_{qs}<0$ and $V_{qsa} \leq V_{dsa}$, then, $$\theta_{LO}=3\pi/2-\tan^{-1}(V_{qsa}/V_{dsa}) \quad (15)$$

If $V_{qs} \geq 0$ and $V_{qsa}<V_{dsa}$, then, $$\theta_{LO}=3\pi/2+\tan^{-1}(V_{qsa}/V_{dsa}) \quad (16)$$

If $V_{qs} \geq 0$ and $V_{qsa} \geq V_{dsa}$, then, $$\theta_{LO}=2\pi-\tan^{-1}(V_{dsa}/V_{qsa}) \quad (17)$$

Hence, from the above-described explanation, it is clear that the estimated electrical angle $\theta_{LO}$ depends on the ratio of the absolute values $V_{dsa}$ and $V_{qsa}$ of respective components $V_{ds}$ and $V_{qs}$ of the axis $d_s$ direction and the axis $q_s$ direction of the voltage vector $V_s$.

To cause the driving control of the motor 2 to be stable and reliable, it is desirable that the voltage waveform of respective induced voltage of the stator windings becomes sine-shaped or cosine-shaped and, moreover, the amplitude of the voltage waveform of respective phases U, V and W becomes identical. For example, assuming that the induced voltage of the U phase has the cosine waveform of an amplitude 1 (non-dimensional), it is desirable that the induced voltage waveforms of other phases are only different in the phase from the cosine waveform of the U phase, and comprise the cosine waveform of the amplitude 1 (non-dimensional). The reason for this is because, in the motor controller for performing a safe and highly reliable control of the position and velocity of the motor 2 by means of the control circuit and the drive circuit of the motor 2 using the three phase alternating-current waveform, it is desirable that the amplitudes of the three phase alternating current waveform are all identical, and the phase of respective phases U, V and W is different from each other in 120 degrees.

Hence, the estimated electrical angle $\theta_{LO}$ according to the present invention essentially does not cause any contradiction as long as the estimated electrical angle $\theta_{LO}$ is calculated from the induced voltage of the stator windings, even if all the amplitudes of the induced voltages of the respective phases U, V and W are taken as an unit level, for example, 1 (non-directional). This is because the estimated electrical angle $\theta_{LO}$ depends on the ratio of $V_{dsa}$ and $V_{qsa}$.

Now, first, a level change of the induced voltage generated in the stator windings by the rotation of the magnetic poles of the rotor is found. It is known that expressions (18) to (20) are established for the induced voltage waveforms of the stator windings. That is, $V_U$, $V_V$ and $V_W$ are expressed as follows:

$$V_U=\cos(\phi+0°)=\cos(\phi+0 \text{ radian}) \quad (18)$$

$$V_V=\cos(\phi+240°)=\cos(\phi+4.1887 \text{ radian}) \quad (19)$$

$$V_W=\cos(\phi+120°)=\cos(\phi+2.0943 \text{ radian}) \quad (20)$$

where the $\phi$ is equivalent to the electrical angle of the induced voltage. For example, respective induced voltage levels for $\phi=0$ (0 radian) are found by the expressions (18) to (20).

Hence, when $\phi=0$ radian, then, $V_U=1.000$, $V_V=-0.500$ and $V_W=-0.500$. These numerical values $V_U$, $V_V$ and $V_W$ are replaced and calculated by the expressions (4) to (17), and $V_{UV}=1.500$, $V_{UW}=0.000$, $V_{qs}=1.500$, $V_{ds}=0.000$, $V_{qsa}=1.500$, and $V_{dsa}=0.000$ are obtained.

Since the estimated electrical angle $\theta_{LO}$ is such that $V_{ds}$, $V_{qs}$, $V_{qsa}$ and $V_{dsa}$ correspond to the condition of the expression 14, eventually, it turns out that the estimated electrical angle $\theta_{LO}=6.283$ radian. It is possible to find other estimated electrical angles $\theta_{LO}$ for the electrical angle of the induced voltage in like manner.

Here, when two poles are taken as an example of the number of poles of the rotor, while the rotor rotates by a mechanical angle $2\pi$ radian (equivalent to 360°), the electrical angle of the induced voltage generated in the stator windings based on the rotation of the magnetic poles of the rotor also becomes identical with the mechanical angle $2\pi$ radian of the rotor and, therefore, the electrical angle of the rotor becomes $2\pi$ radian.

Figure 6:
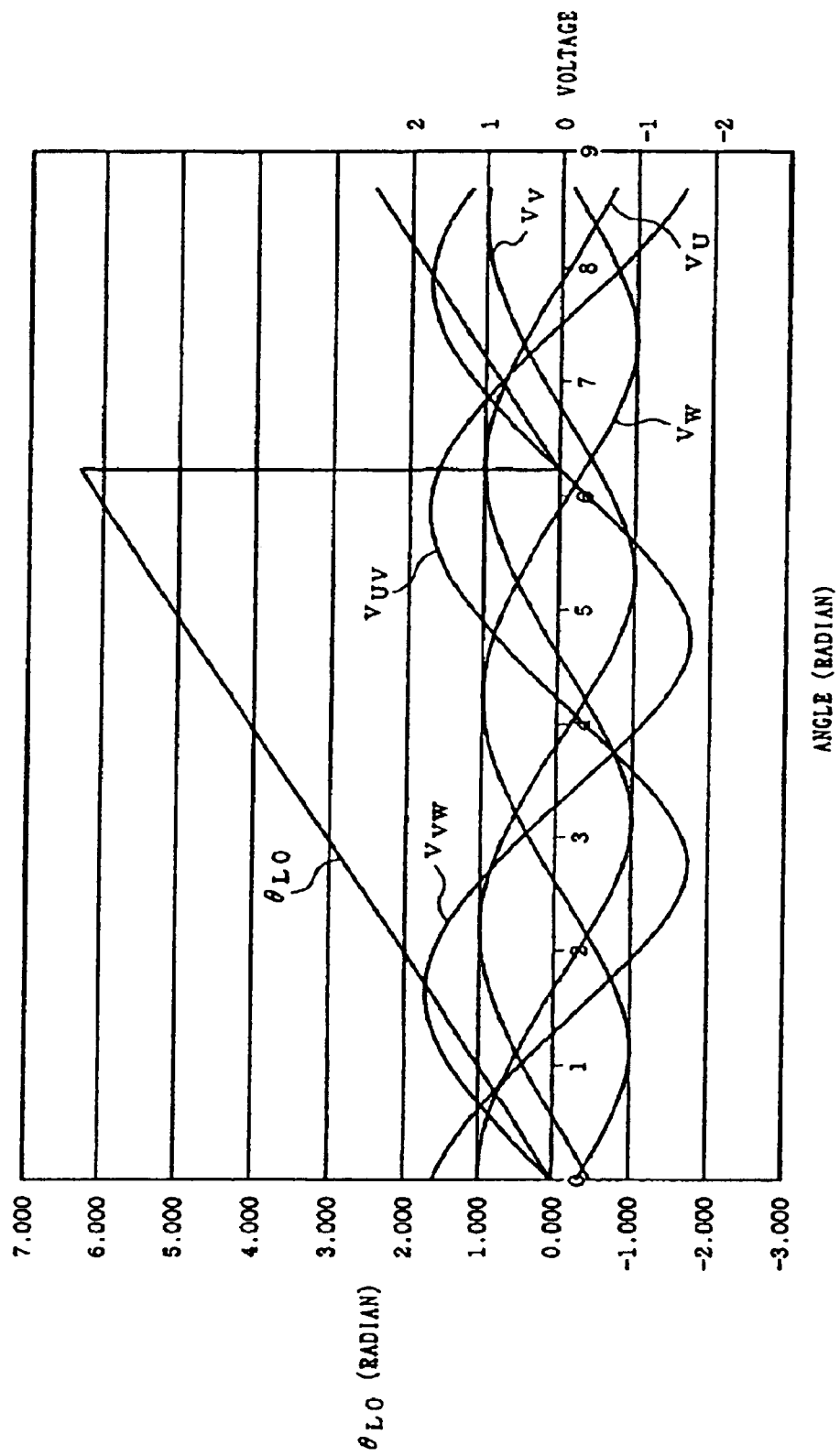
FIG. 6 is a view showing an estimated electrical angle $\theta_{LO}$ found from an induced voltage of the motor.

FIG. 6 is a view showing the estimated electrical angle $\theta_{LO}$ found from the induced voltages of three phases U, V and W for the mechanical angle of the rotor in the case of two poles, the induced voltages $V_U$, $V_V$, and $V_W$ of respective phases, and the level change in respective correlated $V_{UV}$ and $V_{VW}$. Here, the axis of ordinate shows the estimated electrical angle $\theta_{LO}$ (converted to radian), the induced voltages of three phases, and the level of the correlated voltage, and the axis of abscissas shows the mechanical angle of the encoder 3 or the rotor.

That is, FIG. 6 shows that the estimated electrical angle $\theta_{LO}$ linearly changes from 0 to $2\pi$ (equivalent to 6.283 radian) when the mechanical angle of the rotor changes from 0 to $2\pi$ (equivalent to 6.283 radian). The estimated electrical angle $\theta_{LO}$ changes repeatedly in the shape of a saw tooth every time the mechanical angle of the rotor changes by a fixed angle ($2\pi$ radian in this example).

Figure 7:
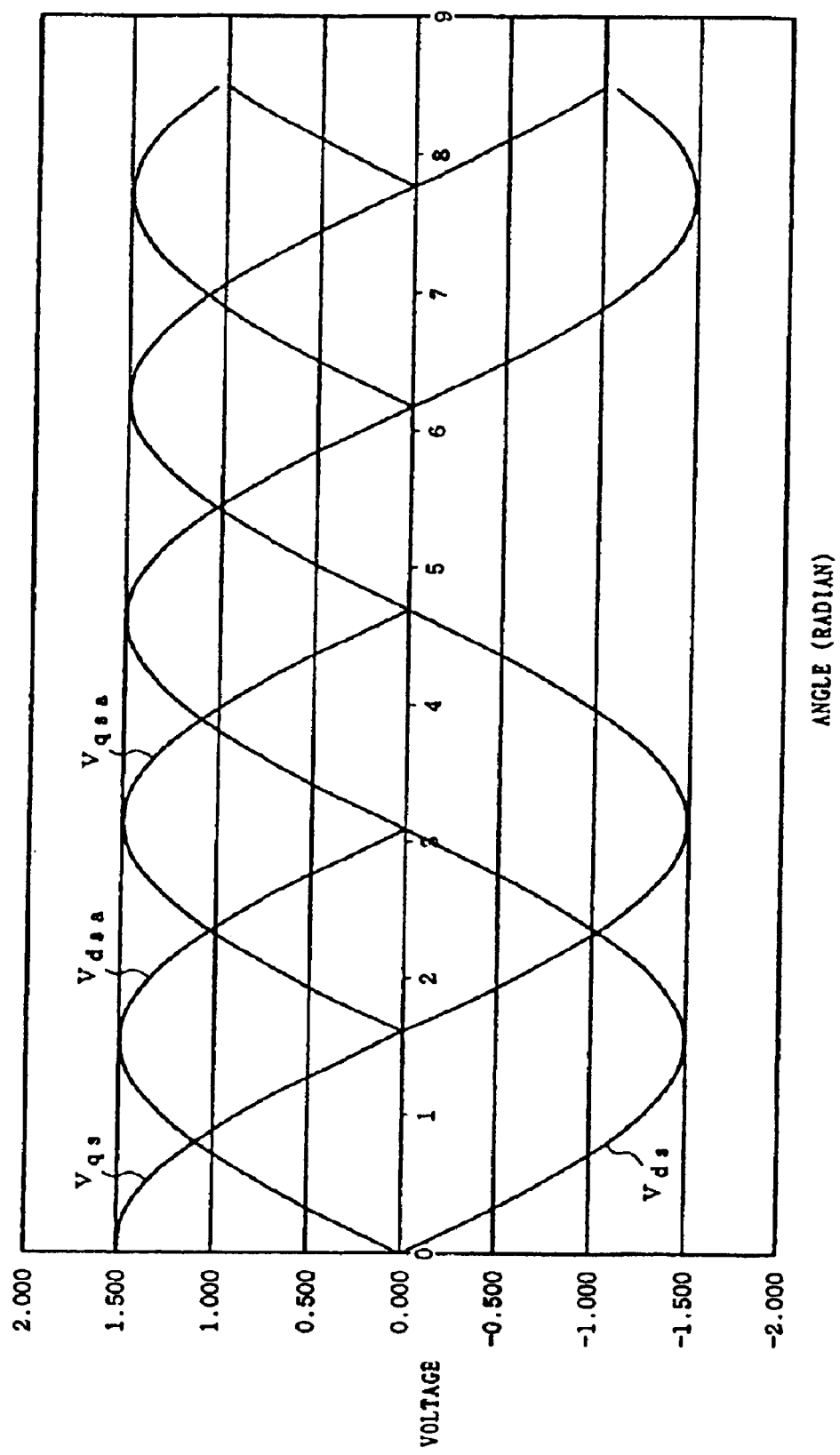
FIG. 7 is a view showing $V_{qs}$ and $V_{ds}$ found from the induced voltage of the motor.

Further, similarly to FIG. 6 in the case of two poles, FIG. 7 is a view showing the relationship between the voltage levels $V_{qs}$ and $V_{ds}$ for the mechanical angle of the rotor or the encoder 3 and the absolute values $V_{qsa}$ and $V_{dsa}$ thereof. Here, the axis of ordinate shows the voltage levels of $V_{qs}$, $V_{ds}$, $V_{qsa}$ and $V_{dsa}$, and the axis of abscissas shows the electrical angle of the induced voltage.

Although the estimated electrical angle $\theta_{LO}$ in the case of two poles has been described as above, in the case of P poles with respect to the relationship between the electrical angle $\theta_{LO}$ of the induced voltage shown in FIG. 6 and the mechanical angle of the rotor, the electrical angle $\theta_{LO}$ eventually becomes P/2 times the mechanical angle of the rotor. Therefore, while the mechanical angle of the rotor (identical with the mechanical angle of the encoder) changes from 0 radian to $2\pi$ radian (equivalent to 360°), the straight line showing the electrical angle $\theta_{LO}$ changes repeatedly by P/2 times, for example, by two times in the case of four poles, and by four times in the case of eight poles in the shape of a saw tooth as shown in FIG. 4. In the case of FIG. 7 similar to FIG. 6, while the mechanical angle of the rotor changes from 0 radian to $2\pi$ radian, $V_{qs}$ and $V_{ds}$ change repeatedly by P/2 times.

Even in the case of the estimated electrical angle $\theta_{LO}$, it is possible to allocate the numerical value identical to the above-described allocation value $C_m$ to the electric angle $2\pi$ radian of the rotor and measure the electrical angle for any mechanical angle of the rotor, for example, from the counter output value of the counter 8.

Next, the estimated electrical angle $\theta_L$ in the case where the motor 2 is loaded will be described based on FIG. 8.

Figure 8:
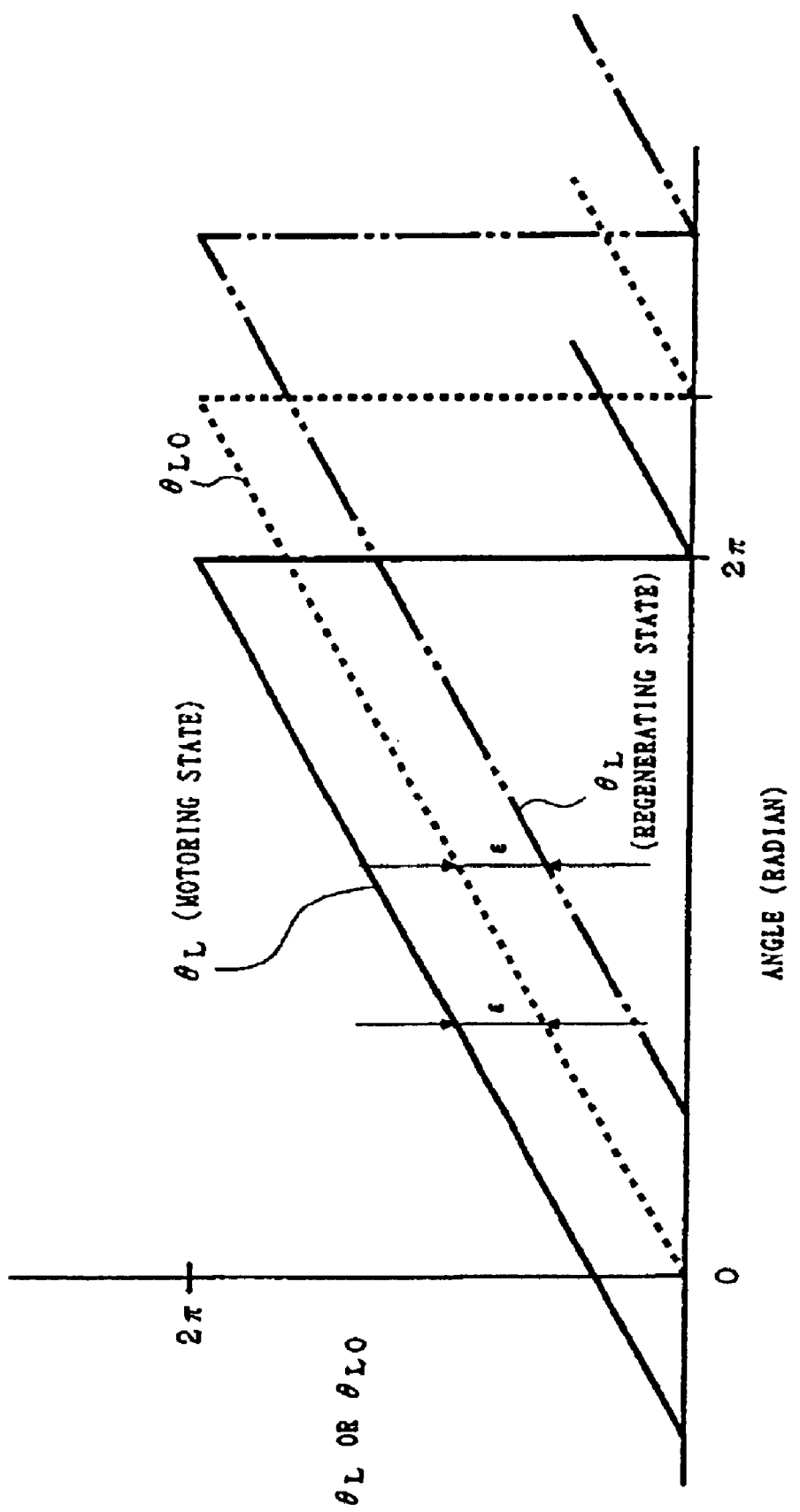
FIG. 8 is a view showing the relationship between the loaded electrical angle $\theta_L$ and the non-loaded electrical angle $\theta_{LO}$.

As shown in FIG. 8, the estimated electrical angle $\theta_L$ is an electrical angle, which advances by an error $\epsilon$ of the electrical angle found by the following expression for the non-loaded estimated electrical angle $\theta_{LO}$. That is, $\theta_L$ is expressed as follows:

$$\theta_L = \theta_{LO} + \epsilon \qquad (21)$$

Moreover, $\epsilon$ is expressed as follows:

$$\epsilon = \tan^{-1}(V_{ds}/V_{qs}) \qquad (22)$$

Here, $V_{qs}$ and $V_{ds}$ are given by the expressions (23) and (24). That is, $$V_{qs} = \sqrt{(2/3)} \times C \qquad (23)$$

$$V_{ds} = 2\sqrt{2\pi(N_m/60) \times (P/2) \times I_s \times I_m} \qquad (24)$$

where C is a line to line voltage at the time of rated rotations of the motor, $N_m$ is the number of motor rotations per minute, $I_s$ is an inductance of the stator windings (q-axis), and $I_m$ is a motor current.

For example, assuming that $I_m = I_{NP}$ (motor rated current)= 5.3 ampere (RMS), $N_m = N_{NP}$ (the number of motor rated rotations per minute)=the number of 3000 rated rotations per minute, P=2 (poles), C=331 volt, and $I_s$=0.0164 henrys, then, $V_{qs}$=270 volt, and $V_{ds}$=38.5 volt, thereby obtaining $\epsilon$=8°. That is, the loaded electrical angle $\theta_L$ becomes a value advanced by eight degrees which is equivalent to the error $\epsilon$ of the electrical angle for the non-loaded estimated electrical angle $\theta_{LO}$.

Now, to be able to compare the electrical angle $\theta_L$ found from the induced voltage for the mechanical angle of the rotor and an electrical angle $\theta_e$ found from the encoder output signal, it is advisable to find an electrical angle ($\theta_L - \epsilon$) and, then, compare that electrical angle ($\theta_L - \epsilon$) and the electrical angle $\theta_e$. That is, for example, in the case where the number of poles are two, it is advisable to find the electrical angle ($\theta_L - \epsilon$) obtained as a result of delaying and calculating the electrical angle $\theta_L$ by the error $\epsilon$ of the electrical angle so that the electrical angle $\theta_L$ reflects a characteristic graphic chart shown in FIG. 6, that is, a saw tooth shaped chart in which, when the mechanical angle in the axis of abscissa is 0 radian, the electrical angle in the axis of ordinate is taken as 0 radian and, when the mechanical angle is $2\pi$ radian, the electrical angle corresponds to $2\pi$ radian and, then, compare that electrical angle ($\theta_L - \epsilon$) and the electrical angle $\theta_e$. Here, the electrical angle error $\epsilon$ can be obtained by calculating the expressions (22), (23) and (24) based on the number of motor rotations detected by the encoder 3 and the current value signal detected by the current detectors 7A, 7B and 7C.

On the other hand, when the motor 2 is loaded and regenerated, $\epsilon$ becomes a negative value, and the estimated electrical angle $\theta_L$ delays by $\epsilon$ for the non-loaded estimated electrical angle $\theta_{LO}$. Hence, similarly to the above-described motoring state, it is possible to find the electrical angle ($\theta_L - \epsilon$) and compare the electrical angle ($\theta_L - \epsilon$) and the electrical angle $\theta_e$.

The magnetic pole position abnormality detection means 23 always calculates a difference between the above described estimated electrical angle $\theta_L$ calculated from the induced voltage of the stator windings of the motor 2 in the mechanical angle of the rotor or the encoder and the electrical angle $\theta_e$ based on the encoder output signal, and if the absolute value of the difference is equal to either a certain stipulated value, for example, 5% of the electrical angle $2\pi$ (the stipulated value is equivalent to 0.314 radian) or smaller than that, it is determined that the encoder 3 is normal. If the above-described absolute value is larger than 5%, it is determined that the encoder 3 is abnormal, and a changeover signal is outputted.

The sensor signal switch 24 is kept connected to a switch 66 and outputs the electrical angle $\theta_e$ in the case where the magnetic pole position abnormality detection means 23 determines that the encoder 3 is normal. On the other hand, in the case where it is determined that the encoder 3 is abnormal, the sensor signal switch 24 is switched from the switch 66 to a switch 67 by the changeover signal, and outputs the estimated electrical angle $\theta_L$.

The velocity computing unit 25 of the velocity control means 6 takes the estimated electrical angle signal $\theta_L$ as an input data and time-differentiates it, and outputs a real angular velocity, which is obtained by multiplying a obtained variation of the estimated electrical angle per unit time by a correction coefficient 2/P based on the P number of poles of the rotor.

Figure 9:
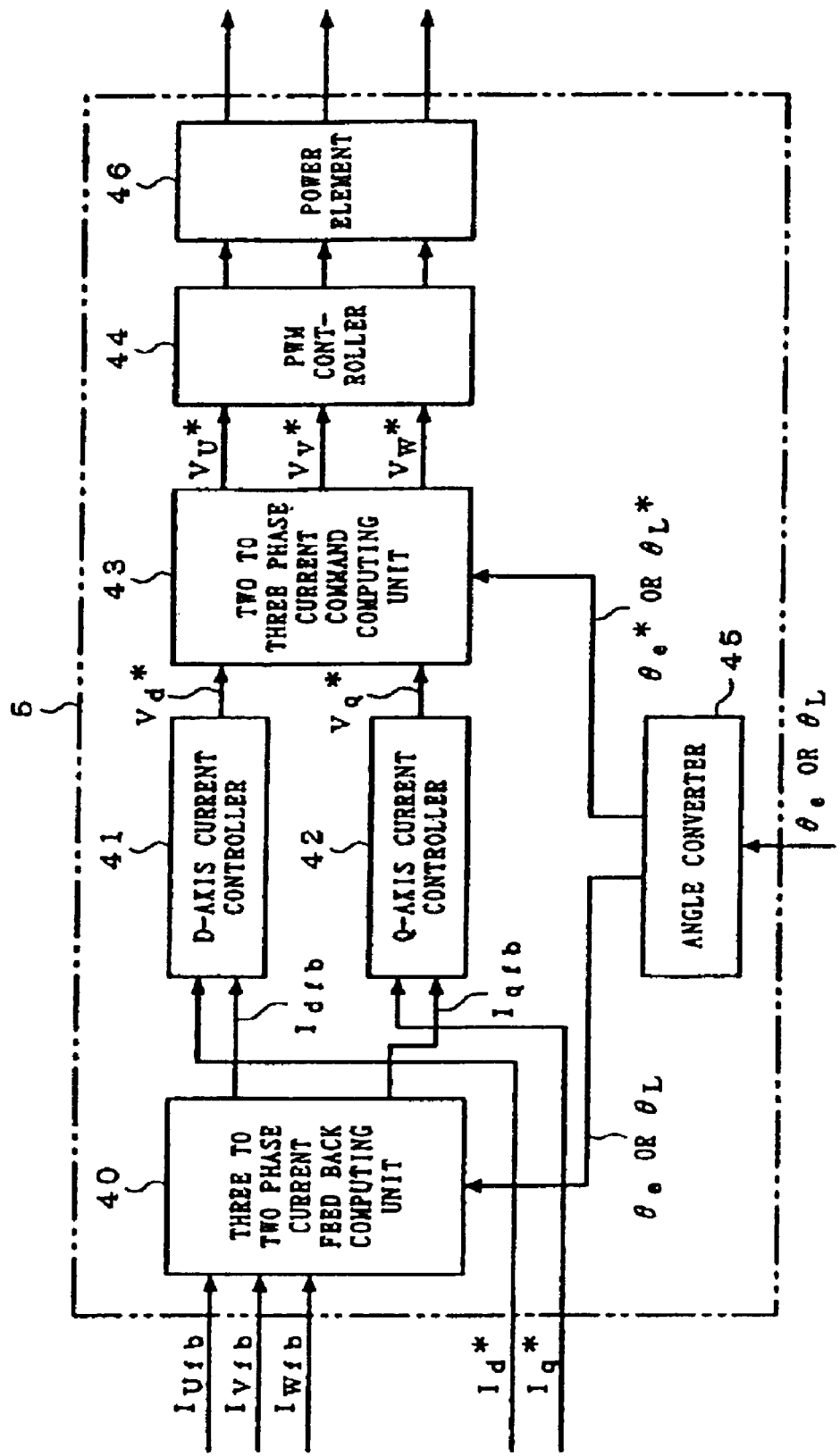
FIG. 9 is a view for explaining one example of inverter means in the motor controller according to the present invention.

FIG. 9 is a view showing the inverter means 5 (or vector control means). The inverter means 5 is constituted by a three to two phase current feedback computing unit 40, a d-axis current controller 41, a q-axis current controller 42, a two to three phase voltage command computing unit 43, a controller 44 of a pulse width modulation system (hereinafter referred to as a PWM controller), an angle converter 45, and a power element 46.

The angle converter 45 takes the estimated electrical angle $\theta_L$ calculated from the induced voltage or the electrical angle $\theta_e$ calculated from the encoder output signal as an input data, and angle-converts the electrical angle $\theta_L$ or electrical angle $\theta_e$ to be adaptable to the three to two phase conversion or the two to three phase conversion when the conversions are effected, and outputs the inherent signal $\theta_e$ or $\theta_L$, in the case of the three to two phase conversion, and outputs an angle-converted $\theta_L^*$ or $\theta_e^*$ in the case of the two to three phase conversion.

The three phase to two phase current feed back computing unit 40 takes the current feed back signals $I_{Ufb}$, $I_{Vfb}$ and $I_{Wfb}$ of the motor 2 detected from the current detectors 7A, 7B and 7C which are provided in the motor 2 and the electrical angle $\theta_L$ or $\theta_e$ phase-converted by the angle converter 45 as input signals, and subjects them to an arithmetic processing, and outputs the d-axis current feed back signal $I_{dfb}$ and the q-axis current feed back signal $I_{qfb}$.

The d-axis current controller 41 takes an excitation current command signal $I_d^*$ and the d-axis current feed back signal $I_{dfb}$ as input signals, and subject them to the arithmetic processing, and outputs a d-axis voltage command signal $V_d^*$.

The q-axis current controller 42 takes a torque command signal $I_q^*$ and a q-axis current feed back signal $I_{qfb}$ as input signals, and subject them to the arithmetic processing, and outputs a q-axis voltage command signal $V_q^*$.

The two to three phase voltage command computing unit 43 takes the d-axis voltage command signal $V_d^*$, the q-axis voltage command signal $V_q^*$, and an electrical angles $\theta_L^*$ or $\theta_e^*$ (two to three phase vector angle) converted by the angle converter 45 as input signals, and subject them to the arithmetic processing, and outputs voltage command signals $V_U^*$, $V_V^*$ and $V_W^*$ of three phases U, V and W.

The PWM controller 44 inputs a signal generated by an oscillator not shown, for example, a chopping wave signal or a saw tooth wave signal and the voltage command signals $V_U^*$, $V_V^*$ and $V_W^*$ of the U phase, V phase and W phase, which are control signals of the motor 2, into a comparator not shown, and subject them to the arithmetic processing, and outputs a pulse width modulation signal to a power element 46.

The power element 46 drives the motor 2 according to the above-described pulse width modulation signal.

Figure 10:
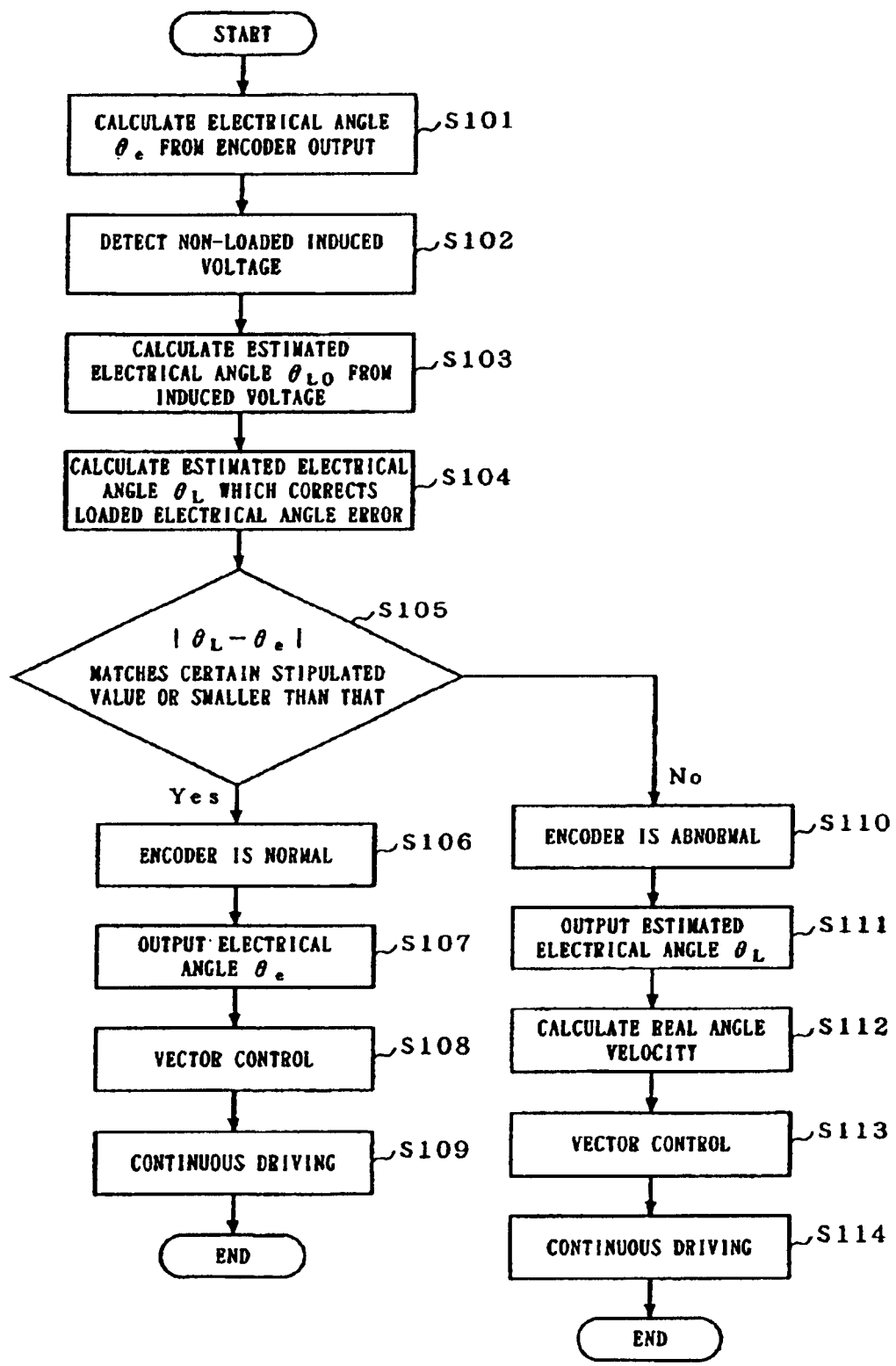
FIG. 10 is a flowchart showing a sensor signal abnormality detection procedure and an operational state in the motor controller according to the present invention.

FIG. 10 is a flowchart showing a sensor signal abnormality detection operation and a drive operation in the motor controller 1.

In FIG. 10, first, the electrical angle $\theta_e$ for the mechanical angle of the encoder 3 is calculated from the output signal of the encoder 3 by the magnetic pole position detection means 20 (step S101). On the other hand, the induced voltage of the non-loaded stator windings of the motor 2 is detected by the voltage FB detection means 21 (step S102). From the detected induced voltage, the non-loaded estimated electrical angle $\theta_{LO}$ of the motor 2 for the electrical angle of the rotor (as described above, if the number of poles are specified, the relationship between the electrical angle of the rotor and the mechanical angle of the encoder 3 can be univocally found) is calculated (step S103). The estimated electrical angle $\theta_L$, which corrects the error $\epsilon$ of the loaded electrical angle of the motor 2, is calculated by the magnetic pole position estimation means 22 (step S104).

In the magnetic pole position abnormality detection means 23, it is determined whether or not the absolute value of the difference between the estimated electrical angle $\theta_L$ and the electrical angle $\theta_e$ in respective mechanical angles of the rotor matches a predetermined stipulated value or is smaller than that (step S105). If the absolute value of the difference between the electrical angle $\theta_L$ and the electrical angle $\theta_e$ matches the predetermined stipulated value or is smaller than that, it is determined that the encoder 3 is normal (step S106), and the electrical angle $\theta_e$ is outputted by the sensor signal switch 24 (step S107). At this time, the motor 2 is vector-controlled (step S108) by the inverter means 5 in response to the electrical angle $\theta_e$, and the motor 2 is continuously driven (step S109).

In the magnetic pole position abnormality detection means 23, if the absolute value of the difference between the electrical angle $\theta_L$ and the electrical angle $\theta_e$ is larger than a certain stipulated value, it is determined that the encoder 3 is abnormal (step S110), and the estimated electrical angle $\theta_L$ is outputted by the sensor signal switch 24 (step S111). The estimated electrical angle $\theta_L$ is inputted to the inverter means 6 and the velocity computing unit 25.

The real angular velocity of the motor 2 is calculated from the estimated electrical angle $\theta_L$ and the number of poles of the rotor by the velocity computing unit 25 (step S112). In the inverter means 5, the motor 2 is vector-controlled in response to this real angular velocity and the estimated electrical angle $\theta_L$ found from the induced voltage of the motor 2 (step S113), and the motor 2 is continuously driven (step S114).

Note that, while the present invention uses an absolute type (absolute value) encoder to detect the rotational position and velocity of the motor 2 as one embodiment, basically the invention is also applicable to an increment type encoder.

As described above, it is possible to perform a safe and highly reliable motor control in the case where abnormality occurs in the feed back detector for detecting the rotational position and velocity of the motor.

What is claimed is:

1. A motor controller, comprising:
   a synchronous motor including stator windings and a rotor;
   a feed back detector that detects a position and a velocity of the rotor and produces an output signal;
   a magnetic pole position detector that determines a magnetic pole position of the rotor based, at least on part, on the output signal;
   a power control apparatus that controls electric power supplied to said synchronous motor according to said detected magnetic pole position;
   a magnetic pole position estimator that estimates the magnetic pole position of the rotor from an induced voltage of the stator windings; and
   a magnetic pole position abnormality detector that 1) compares said detected magnetic pole position and the estimated magnetic pole position and 2) determines that the said feed back detector is abnormal when an absolute value of the difference between said detected magnetic pole position and the estimated magnetic pole position is larger than a predetermined value:
   wherein, when an abnormality of said feed back detector is determined, said power control apparatus controls the electric power according to said estimated magnetic pole position.

2. The motor controller according to claim 1, wherein said feed back detector is an encoder.

3. The motor controller according to claim 2, wherein said magnetic pole position detector calculates a mechanical angle of the encoder from the output signal, and calculates an electrical angle representing the position of the magnetic pole from the mechanical angle.

4. The motor controller according to claim 3, wherein said magnetic pole position estimator calculates a correlated voltage from the induced voltage of said stator windings, calculates a non-loaded estimated electrical angle from the correlated voltage, and calculates a loaded electrical angle from the estimated electrical angle.

5. The motor controller according to claim 4, wherein the motor controller further comprises a velocity calculator that calculates a real angular velocity of said synchronous motor from the loaded electrical angle and the number of magnetic poles of the rotor.

6. The motor controller according to claim 5, wherein when said magnetic pole position abnormality detector determines that said feed back detector is abnormal, said loaded electrical angle is inputted to said velocity calculator and the real angular velocity is inputted to said power control apparatus.

7. The motor controller according to claim 1, wherein said power control apparatus comprises an inverter.

8. A method of operating a motor controller including a synchronous motor having stator windings and a rotor, the method comprising:
   (A) detecting a position and a velocity of the rotor and producing an output signal;
   (B) determining a magnetic pole position of the rotor from the output signal;
   (C) controlling electric power supplied to said synchronous motor according to said detected magnetic pole position;
   (D) estimating the magnetic pole position of the rotor from an induced voltage of the stator windings;
   (E) comparing said detected magnetic pole position and the estimated magnetic pole position;

(F) determining that the feed back detector is abnormal when an absolute value of the difference between the detected magnetic pole position and the estimated magnetic pole position is larger than a predetermined value; and (G) controlling the electric power according to the estimated magnetic pole position when an abnormality of the feed back detector is determined.

9. The method as recited in claim 8, wherein said feed back detector comprises an encoder, wherein step (B) further comprises:

calculating a mechanical angle of the encoder from the output signal; and calculating an electrical angle representing the position of the magnetic pole from the mechanical angle.

10. The method as recited in claim 9, wherein step (B) further comprises calculating a mechanical angle of the encoder from the output signal, and calculating an electrical angle representing the position of the magnetic pole from the mechanical angle.

11. The method as recited in claim 10, wherein step (D) further comprises calculating a correlated voltage from the induced voltage of said stator windings, calculating a non-loaded estimated electrical angle from the correlated voltages, and calculating a loaded electrical angle from the estimated electrical angle.

12. The method as recited in claim 11, further comprising the step of calculating a real angular velocity of said synchronous motor from said loaded electrical angle and the number of magnetic poles of the rotor.

13. The method as recited in claim 12, further comprising the step of inputting the loaded electrical angle to the velocity calculator and inputting the real angular velocity to the power control apparatus in response to determining that the feed back detector is abnormal.

* * * * *

UNITED STATES PATENT AND TRADEMARK OFFICE
CERTIFICATE OF CORRECTION

PATENT NO. : 6,906,491 B2  
DATED : June 14, 2005  
INVENTOR(S) : Matsuo et al.

It is certified that error appears in the above-identified patent and that said Letters Patent is hereby corrected as shown below:

Column 3,  
Line 34, "$d_o$-$q_e$" should be -- $d_e$-$q_e$ --

Signed and Sealed this

Ninth Day of August, 2005

JON W. DUDAS  
*Director of the United States Patent and Trademark Office*